United States Patent
Elzur et al.

(10) Patent No.: US 6,629,125 B2
(45) Date of Patent: Sep. 30, 2003

(54) STORING A FRAME HEADER (75) Inventors: Uri Elzur, Zichron Yaakov (IL); Dan G. Wartski, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/188,377

(22) Filed: Jul. 2, 2002

(65) Prior Publication Data

US 2003/0005142 A1 Jan. 2, 2003

Related U.S. Application Data (62) Division of application No. 09/364,374, filed on Jul. 30, 1999, now Pat. No. 6,449,656.

(51) Int. Cl.[7] .......................... G06F 13/00; G06F 11/08
(52) U.S. Cl. ........................ 709/200; 708/530; 714/703
(58) Field of Search ................................. 709/200, 201; 708/530, 531, 532, 533; 714/52, 703, 704, 705

(56) References Cited

U.S. PATENT DOCUMENTS

| | | | | |
|---|---|---|---|---|
| 5,608,892 A | * | 3/1997 | Wakerly | 395/445 |
| 5,664,116 A | * | 9/1997 | Gaytan et al. | 709/234 |
| 5,832,235 A | * | 11/1998 | Wilkes | 709/247 |
| 5,875,466 A | * | 2/1999 | Wakerly | 711/138 |
| 5,892,924 A | * | 4/1999 | Lyon et al. | 370/405 |
| 6,047,304 A | * | 4/2000 | Ladwig et al. | 708/530 |
| 6,141,738 A | * | 10/2000 | Munter et al. | 711/206 |
| 6,243,720 B1 | * | 6/2001 | Munter et al. | 707/206 |
| 6,289,023 B1 | * | 9/2001 | Dowling et al. | 370/419 |
| 6,343,306 B1 | * | 1/2002 | Lo | 708/700 |

* cited by examiner

Primary Examiner—Moustafa M. Meky
(74) Attorney, Agent, or Firm—Trop, Pruner & Hu, P.C.

(57) ABSTRACT

A method and apparatus for use with a computer system are disclosed. A packet is received that includes a header. The header indicates at least one characteristic that is associated with a layer of a protocol stack. The packet is parsed in hardware to extract the characteristic(s), and the packet is processed based on the parsing. Hardware may construct subsequent headers and update fields of the transport, network and data link layers.

4 Claims, 12 Drawing Sheets

FIG. 12

STORING A FRAME HEADER

This is a divisional of prior application Ser. No. 09/364,374, filed Jul. 30, 1999, now U.S. Pat. No. 6,449,656.

BACKGROUND

The invention relates to storing a frame header, for example in connection with a network controller.

Figure 1:
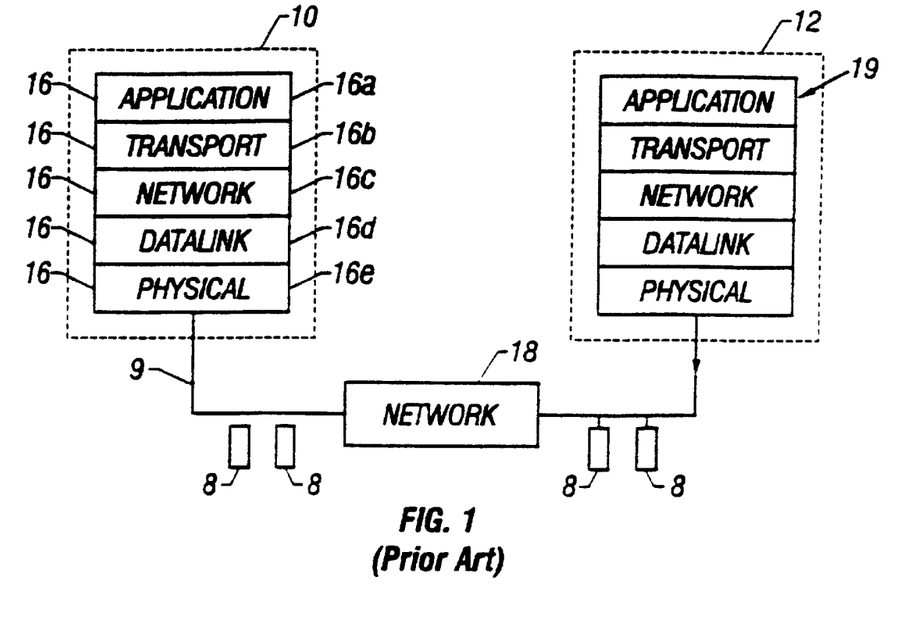
FIG. 1 is a schematic diagram of a network of computers according to the prior art.

Referring to FIG. 1, a server 12 may communicate with a client 10 by transmitting packets 8 of information over a network 18 pursuant to a network protocol. As an example, the network protocol may be a Transmission Control Protocol/Internet Protocol (TCP/IP), and as a result, the client 10 and server 12 may implement protocol stacks, such as TCP/IP stacks 17 and 19, respectively. For the client 10 (as an example), the TCP/IP stack 17 conceptually divides the client's software and hardware protocol functions into five hierarchical layers 16 (listed in hierarchical order): an application layer 16a (the highest layer), a transport layer 16b, a network layer 16c, a data link layer 16d and a physical layer 16e (the lowest layer).

More particularly, the physical layer 16e typically includes hardware (a network controller, for example) that establishes physical communication with the network 18 by generating and receiving signals (on a network wire 9) that indicate bits of the packets 8. The physical layer 16e recognizes bits and does not recognize packets, as the data link layer 16d performs this function. In this manner, the data link layer 16d typically is both a software and hardware layer that may, for transmission purposes, cause the client 10 to package the data to be transmitted into the packets 8. For purposes of receiving packets 8, the data link layer 16d may, as another example, cause the client 10 to determine the integrity of the incoming packets 8 by determining if the incoming packets 8 generally conform to predefined formats and if the data of the packets comply with checksums (or cyclic redundancy check (CRC))of the packets, for example.

The network layer 16c typically is a software layer that is responsible for routing the packets 8 over the network 18. In this manner, the network layer 16c typically causes the client 10 to assign and decode Internet Protocol (IP) addresses that identify entities that are coupled to the network 18, such as the client 10 and the server 12. The transport layer 16b typically is a software layer that is responsible for such things as reliable data transfer between two end points and may use sequencing, error control and general flow control of the packets 8 to achieve reliable data transfer. The transport layer 16b may cause the client 10 to implement the specific network protocol, such as the TCP/IP protocol or a User Datagram Protocol (UDP) or Realtime Transport Protocol(RTP) which exists on top of UDP, as examples. The application layer 16a typically includes network applications that, upon execution, cause the client 10 to generate and receive the data of the packets 8.

Figure 2:
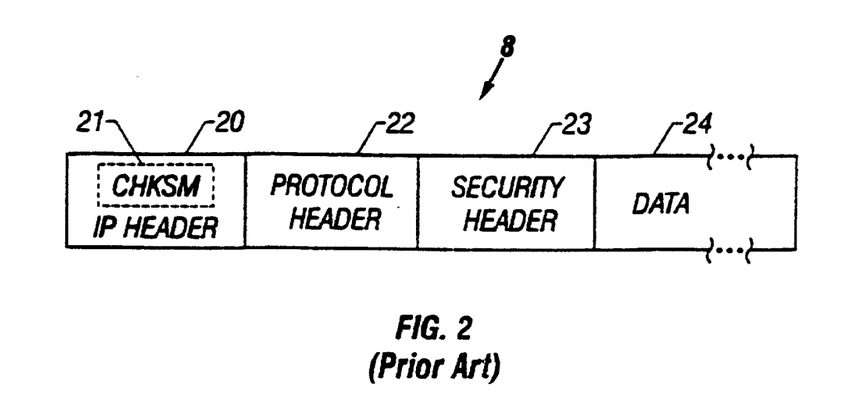
FIG. 2 is a schematic diagram of a packet transmitted over the network shown in FIG. 1.

Referring to FIG. 2, a typical packet 8 may include an IP header 20 that indicates such information as the source and destination IP addresses for the packet 8. The packet 8 may also include a security header 23 that indicates a security protocol (e.g. IPSec) and attributes of the packet 8 and a protocol header 22 (a TCP or an UDP protocol header, as examples) that is specific to the transport protocol being used. As an example, a TCP protocol header might indicate a TCP destination port and a TCP source port that uniquely identify the applications that cause the client 10 and server 12 to transmit and receive the packets 8. The packet 8 may also include a data portion 24, the contents of which are furnished by the source application. The packet 8 may include additional information, such as a trailer 26, for example, that is used in connection with encryption and/or authentication of the data portion 24.

Figure 3:
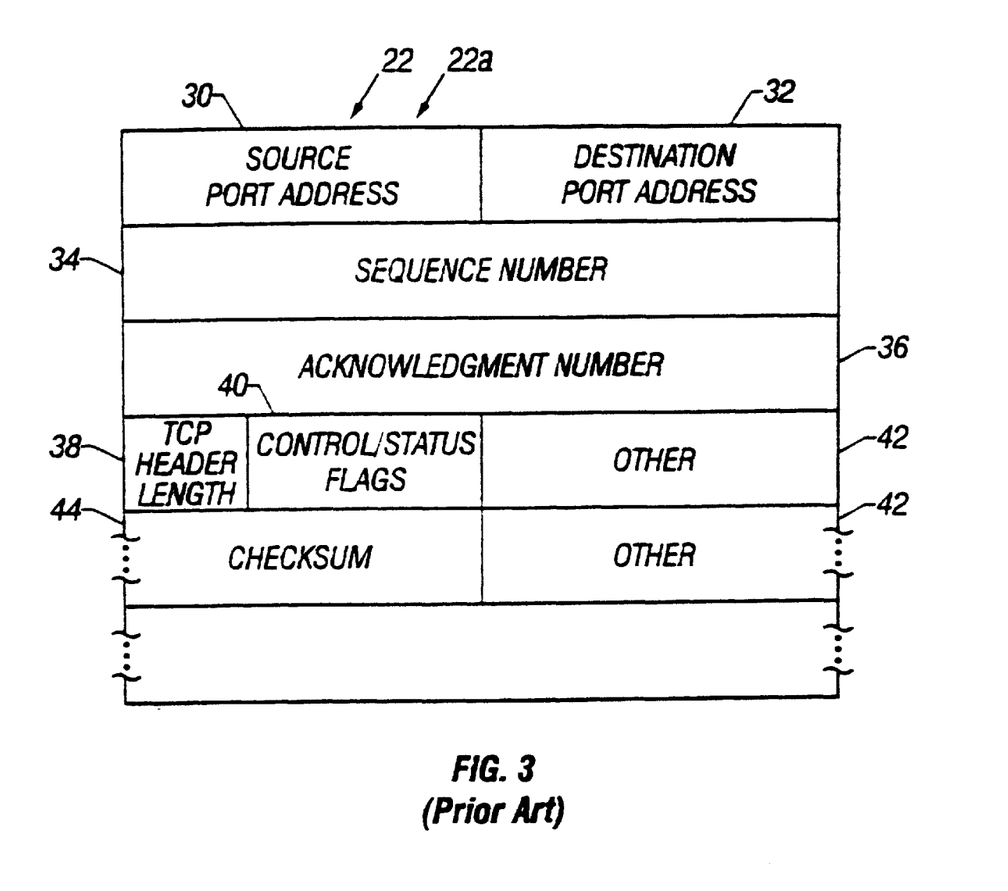
FIG. 3 is an illustration of an exemplary protocol header of the packet of FIG. 2.

Referring to FIG. 3, as an example, a TCP protocol header 22a may include a field 30 that indicates the TCP source port address and a field 32 that indicates the TCP destination port address. Another field 34 of the TCP protocol header 22a may indicate a sequence number that is used to concatenate received packets of an associated flow. In this manner, packets 8 that have the same IP addresses, transport layer port addresses (and security attributes), are typically part of the same flow, and the sequence number indicates the order of a particular packet 8 in that flow. Thus, as an example, a packet 8 with a sequence number of "244" typically is transmitted before a packet 8 with a sequence number of "245."

The TCP protocol header 22a may include a field 38 that indicates a length of the header 22a, a field 44 that indicates a checksum for the bytes in the header 22a and a field 40 that indicates control and status flags.

In order to transmit data from one application to another over the network wire, the data is segmented into frames. The maximum number of bytes that can be packed into one frame is called the maximal transmit unit (MTU). Thus, the operating system may pass data units down to hardware, such as network controller, in units that correspond to the MTU.

There is overhead associated with segmenting the data into MTUs, creating the frame header at all layers, and transmitting multiple messages down the stack to a miniport driver or other drivers for other operating systems or hardware. A driver, containing device specific information, communicates with non-device specific port drivers that in turn communicate with the protocol stack on behalf of the system. When the operating system wishes to offload some of that overhead, it may pass data to the miniport driver or hardware in data units larger than the MTU. This type of transfer is generally called a large send. The miniport driver or hardware can now segment the data and create the framing information.

Generally a large send requires that header information be recreated for successive frames. However, this will result in delay and overhead and also requires the header to be read across the system bus with every segment prior to its modification. This may increase the overall delay to complete the data exchange between the client and the server and consume bus resources that are important especially for server and multiple controller systems.

Thus, there is a continuing need for implementing a large send in a way which reduces the consumption of bus resources.

SUMMARY

In one embodiment of the invention, a method for use with a computer system, includes receiving output data from the computer system, extracting the header of the packet; storing a header from said data in a header memory, retrieving the header from header memory and parsing the header to add additional information to the header.

DETAILED DESCRIPTION

Figure 4:
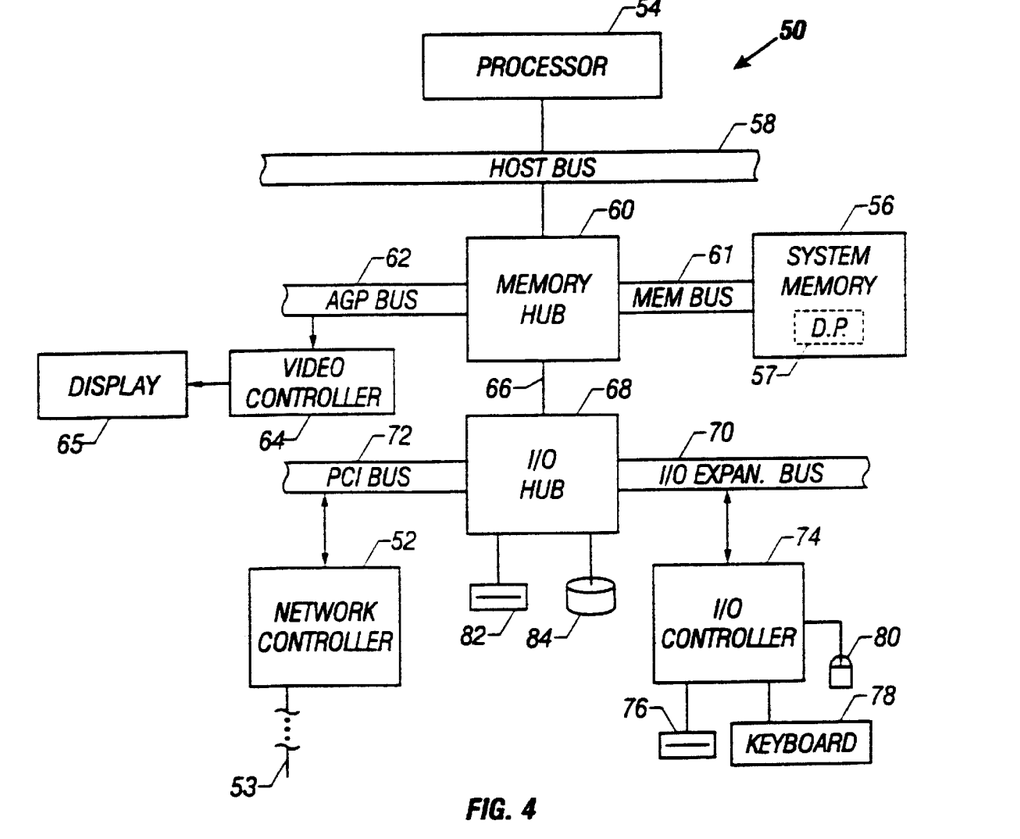
FIG. 4 is a schematic diagram of a computer system according to an embodiment of the invention.

Referring to FIG. 4, an embodiment 50 of a computer system in accordance with the invention includes a network controller 52 (a local area network (LAN) controller, for example) that communicates packets of information with other networked computer systems via at least one network wire 53. Unlike conventional network controllers, the network controller 52 may be adapted in one embodiment of the invention, to perform functions that are typically implemented by a processor (a central processing unit (CPU), for example) that executes one or more software layers (a network layer and a transport layer, as examples) of a protocol stack (a TCP/IP stack, for example). As an example, these functions may include parsing headers of incoming packets to obtain characteristics (of the packet) that typically are extracted by execution of the software layers. The characteristics, in turn, may be used to identify a flow that is associated with the packet, as further described below.

Figure 5:
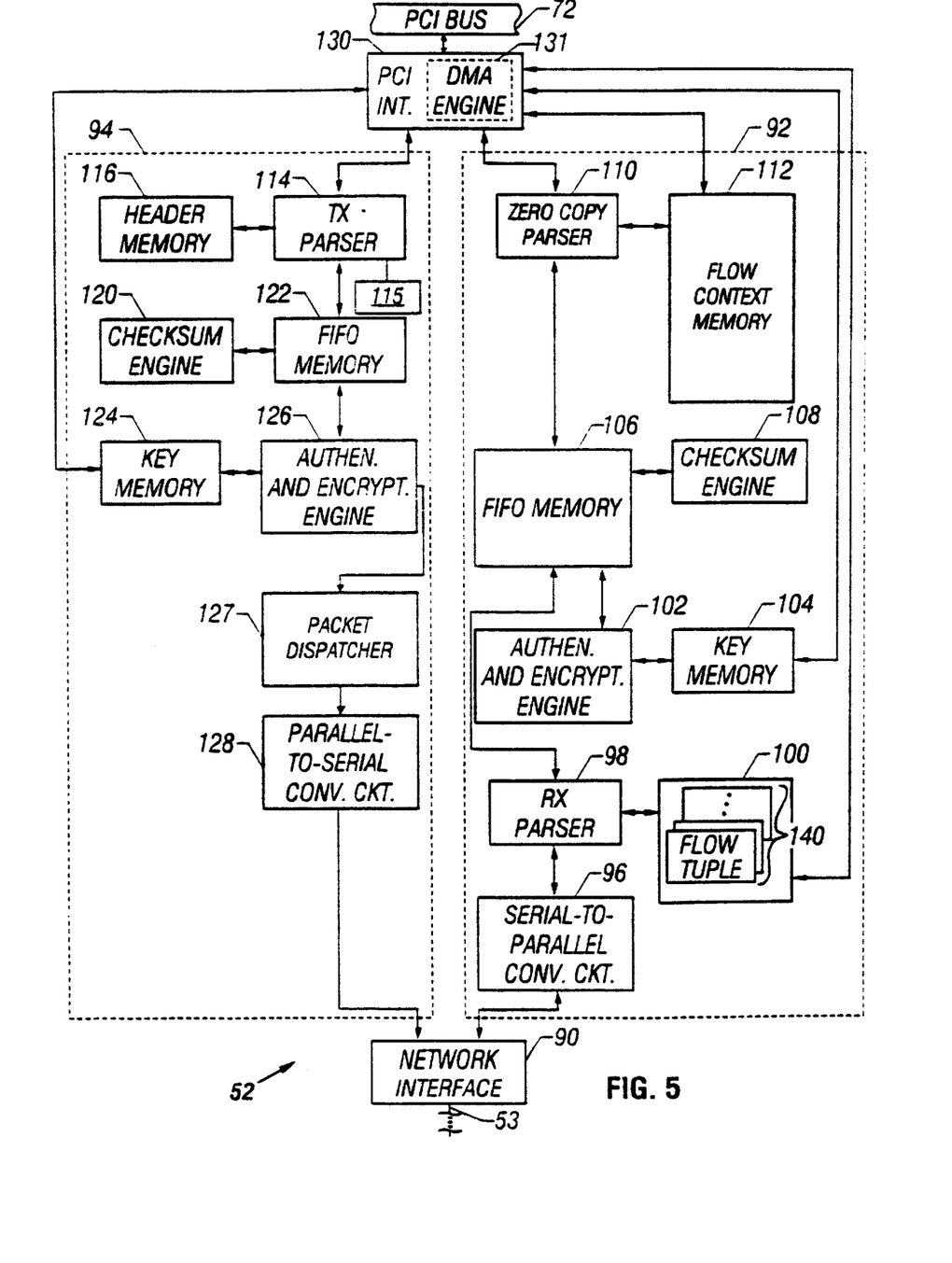
FIG. 5 is a schematic diagram of a network controller of FIG. 4.

Referring to FIG. 5, the network controller 52 may include hardware, such as a receive path 92, to perform traditional software functions to process packets that are received from the network. For example, the receive path 92 may include a receive parser 98 to parse a header of each packet to extract characteristics of the packet, such as characteristics that associate a particular flow with the packet. Because the receive path 92 may be receiving incoming packets from many different flows, the receive path 92 may include a memory 100 that stores entries, or flow tuples 140, that uniquely identify a particular flow. In this manner, the receive parser 98 may interact with the memory 100 to compare parsed information from the incoming packet with the stored flow tuples 140 to determine if the flow if detected, or "flow tuple hit," occurs. If a flow tuple hit occurs, the receive parser 98 may indicate this event to other circuitry (of the controller 52) that processes the packet based on the detected flow, as further described below.

Figure 6:
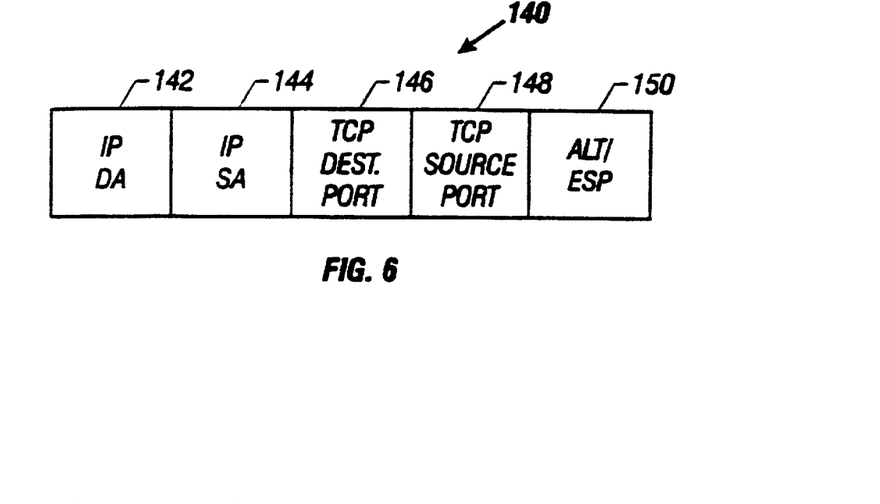
FIG. 6 is an illustration of a flow tuple stored in memory of the network controller of FIG. 5.

Referring also to FIG. 6, each flow tuple 140 may include fields that identify characteristics of a particular flow. As an example, in some embodiments, at least one of the flow tuples 140 may be associated with a Transmission Control Protocol (TCP), a User Datagram Protocol (UDP) or a Realtime Transport Protocol (RTP), as just a few examples. The flow tuple 140 may include a field 142 that indicates an Internet protocol (IP) destination address (i.e., the address of the computer system to receive the packet); a field 144 that indicates an IP source address (i.e., the address of a computer system to transmit the packet); a field 146 that indicates a TCP destination port (i.e., the address of the application that caused generation of the packet); a field 148 that indicates a TCP source port (i.e., the address of the application that is to receive the packet); and a field 150 that indicates security/authentication attributes of the packet. Other flow tuples 140 may be associated with other network protocols, such as a User Datagram Protocol (UDP), for example. The above references to specific network protocols are intended to be examples only and are not intended to limit the scope of the invention. Additional flow tuples 140 may be stored in the memory 100 and existing flow tuples 140 may be removed from the memory 100 via a driver program 57 (FIG. 4).

If the receive parser 98 recognizes (via the flow tuples 140) the flow that is associated with the incoming packet, then the receive path 92 may further process the packet. If the receive parser 98 does not recognize the flow, then the receive path 92 may pass the incoming packet via a Peripheral Component Interconnect (PCI) interface 130 to software layers of a TCP/IP stack of the computer system 50 for processing. The PCI Specification is available from The PCI Special Interest Group, Portland, Oreg. 97214. Other bus interfaces may be used in place of the PCI interface 130. In this manner, in some embodiments, the computer system 50 may execute an operating system that provides at least a portion of some layers (network and transport layers, for example) of the protocol stack.

In some embodiments, even if the receive parser 98 recognizes the flow, additional information may be needed before receive path 92 further processes the incoming packet 52. For example, an authentication/encryption engine 102 may authenticate and/or decrypt the data portion of the incoming packet based on the security attributes that are indicated by the field 150 (see FIG. 6). In this manner, if the field 150 indicates that the data portion of the incoming packet is encrypted, then the engine 102 may need a key to decrypt the data portion. If authenticated, a key may be used to check authenticity.

For purposes of providing the key to the engine 102, the network controller 52 may include a key memory 104 that stores different keys that may be indexed by the different associated flows, for example. Additional keys may be stored in the key memory 104 by execution of the driver program 57, and existing keys may be removed from the key memory 104 by execution of the driver program 57. In this manner, if the engine 102 determines that the particular decryption key is not stored in the key memory 104, then the engine 102 may submit a request (via the PCI interface 130) to the driver program 57 (see FIG. 4) for the key. In this manner, the driver program 57, when executed, may furnish the key in response to the request and interact with the PCI interface 130 to store the key in the key memory 104. In some embodiments, if the key is unavailable (i.e., the key is not available from the driver program 57 or is not stored in the key memory 104), then the engine 102 does not decrypt the data portion of the packet. Instead, the PCI interface 130 stores the encrypted data in a predetermined location of a system memory 56 (see FIG. 4) so that software of one or more layers of the protocol stack may be executed to decrypt the data portion of the incoming packet.

Figure 7:
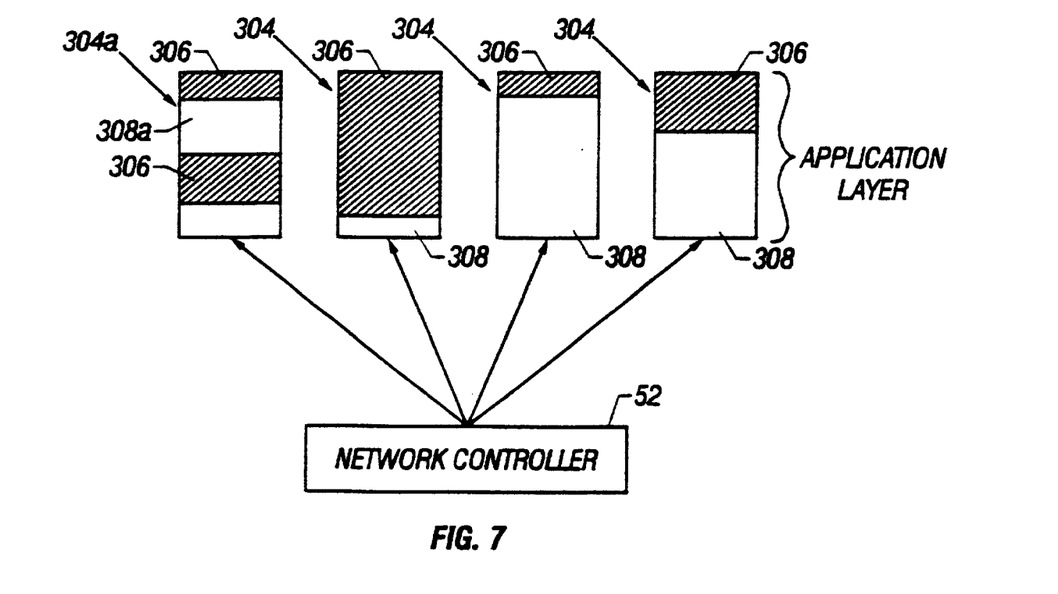
FIG. 7 is a schematic diagram illustrating the transfer of packet data according to an embodiment of the invention.

After the parsing, the processing of the packet by the network controller 52 may include bypassing the execution of one or more software layers of the protocol stack. For example, the receive path 92 may include a zero copy parser 110 that, via the PCI interface 130, copies data associated with the packet into a memory buffer 304 (see FIG. 7) that is associated with the application. In this manner, several applications may have associated buffers for receiving the packet data. The operating system creates and maintains the buffers 304 in a virtual address space, and the operating system reserves a multiple number of physical four kilobyte (KB) pages for each buffer 304. The operating system also associates each buffer with a particular application. This arrangement is to be contrasted to conventional arrangements that may use intermediate buffers to transfer packet data from the network controller to applications, as described below.

Figure 8:
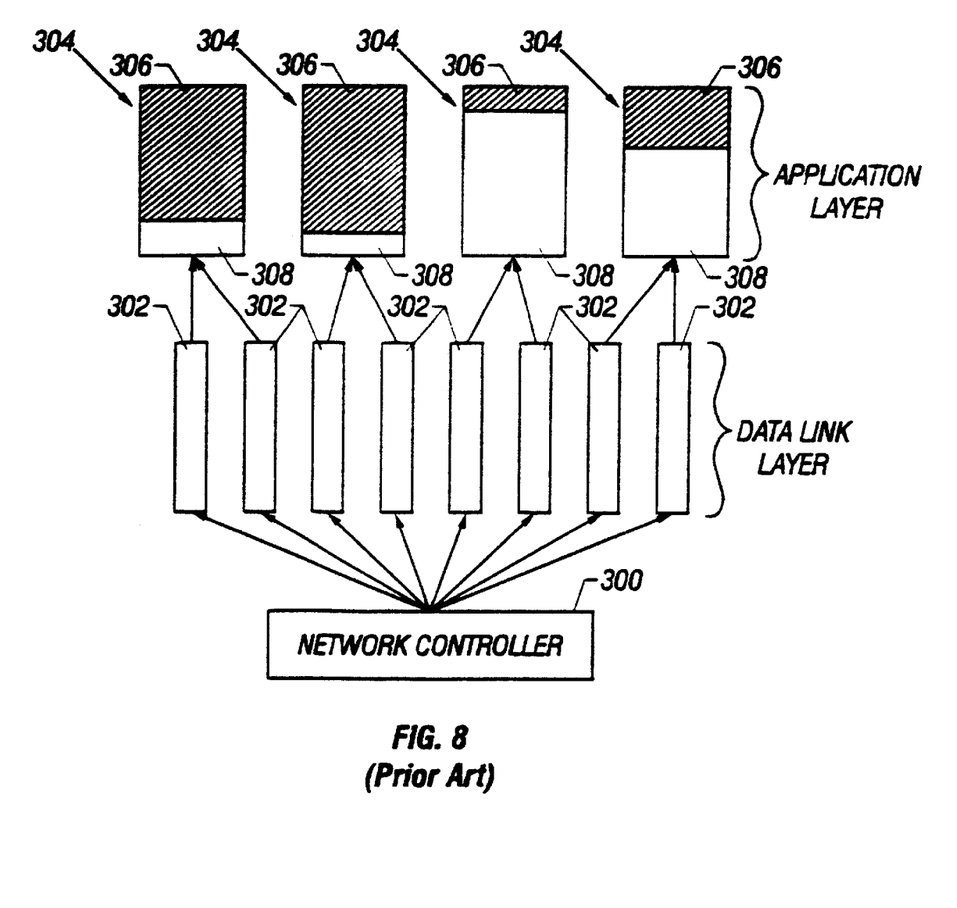
FIG. 8 is a schematic diagram illustrating the transfer of packet data between layers of the network stack of the prior art.

Referring to FIG. 8, for example, a typical network controller 300 does not directly transfer the packet data into the buffers 304 because the typical network controller 300 does not parse the incoming packets to obtain information that identifies the destination application. Instead, the typical network controller 300 (under the control of the data link layer, for example) typically transfers the data portion of the packet into packet buffers 302 that are associated with an intermediate layer e.g. the data link, the network layer or the transport layer. In contrast to the buffers 304, each buffer 302 may have a size range of 64 to 1518 bytes. The execution of the network layer subsequently associates the data with the appropriate applications and causes the data to be transferred from the buffers 302 to the buffers 304.

Referring back to FIG. 7, in contrast to the conventional arrangement described above, the network controller 52 may use the zero copy parser 110 to bypass the buffers 302 and copy the data portion of the packet directly into the appropriate buffer 304. To accomplish this, the zero copy parser 110 (see FIG. 5) may receive an indication of the TCP destination port (as an example) from the receive parser 98 that, as described above, extracts this information from the header. The TCP or other protocol destination port uniquely identifies the application that is to receive the data and thus, identifies the appropriate buffer 304 for the packet data. Besides transferring the data portions to the buffers 304, the zero copy parser 110 may handle control issues between the network controller and the network stack and may handle cases where an incoming packet is missing, as described below.

Referring to FIG. 5, besides the components described above, the receive path 92 may also include one or more first-in-first-out (FIFO) memories 106 to synchronize the flow of incoming packets through the receive path 92. A checksum engine 108 (of the receive path 92) may be coupled to one of the FIFO memories 106 for purposes of verifying checksums that are embedded in the packets. The receive path 92 may be interfaced to a PCI bus 72 via the PCI interface 130. The PCI interface 130 may include an emulated direct memory access (DMA) engine 131. In this manner, for purposes of transferring the data portions of the packets directly into the buffers 304, the zero copy parser 110 may use one of a predetermined number (sixteen, for example) of emulated DMA channels to transfer the data into the appropriate buffer 304. In some embodiments, it is possible for each of the channels to be associated with a particular buffer 304. However, in some embodiments, when the protocol stack (instead of the zero copy parser 110) is used to transfer the data portions of the packets the DMA engine 131 may use a lower number (one, for example) of channels for these transfers.

In some embodiments, the receive path 92 may include additional circuitry, such as a serial-to-parallel conversion circuit 96 that may receive a serial stream of bits from a network interface 90 when a packet is received from the network wire 53. In this manner, the conversion circuit 96 packages the bits into bytes and provides these bytes to the receive parser 98. The network interface 90 may be coupled to generate and receive signals to/from the wire 53.

In addition to the receive path 92, the network controller 52 may include other hardware circuitry, such as a transmit path 94, to transmit outgoing packets to the network. In the transmit path 94, the network controller 52 may include a transmit parser 114 that is coupled to the PCI interface 130 to receive outgoing packet data from the computer system 50 and form the header on the packets. To accomplish this, in some embodiments, the transmit parser 114 stores the headers of predetermined flows in a header memory 116. Because the headers of a particular flow may indicate a significant amount of the same information (port and IP addresses, for example), the transmit parser 114 may slightly modify the stored header for each outgoing packet and assemble the modified header onto the outgoing packet. As an example, for a particular flow, the transmit parser 114 may retrieve the header from the header memory 116 and parse the header to add such information as sequence and acknowledgment numbers (as examples) to the header of the outgoing packet. A checksum engine 120 may compute checksums for the IP and network headers of the outgoing packet and incorporate the checksums into the packet.

The transmit path 94 may also include an authentication and encryption engine 126 that may encrypt and/or authenticate the data of the outgoing packets. In this manner, all packets of a particular flow may be encrypted (and/or authenticated) via a key that is associated with the flow, and the keys for the different flows may be stored in a key memory 124. The key memory 124 may be accessed (by execution of the driver program 57, for example) via the PCI interface 130. The transmit path 94 may also include a parallel-to-serial conversion circuit 128 to serialize the data of the outgoing packets. The circuit 128 may be coupled to the network interface 90. The transmit path 94 may also include one or more FIFO memories 122 to synchronize the flow of the packets through the transmit path 94.

Figure 5A:
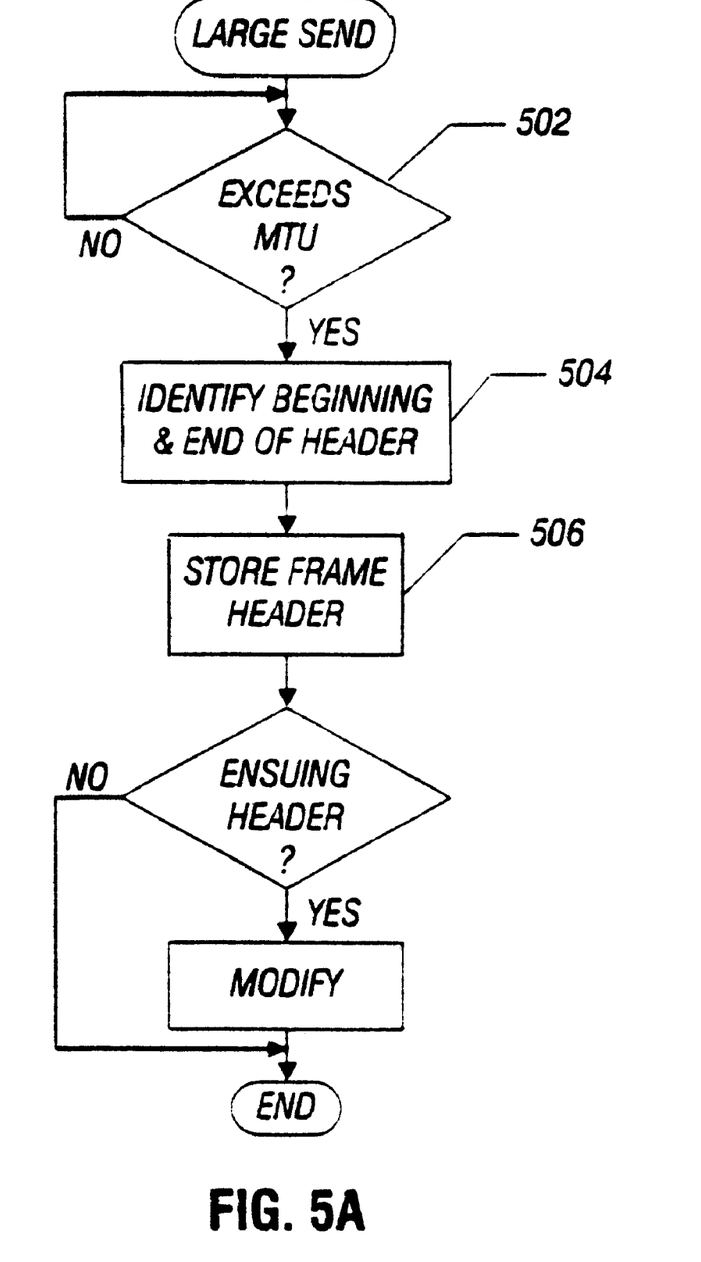
FIG. 5a is a flow diagram illustrating a large send.

Referring to FIG. 5a, in connection with a large send, where the data received by the controller 52 exceeds the maximal transmit unit (MTU) (diamond 502), the beginning and end of the first frame header may be identified (block 504). The first frame header may be stored in the header memory 116 (block 506). In some embodiments this may save the overhead of re-reading the header over the PCI bus in special accesses for every frame. Each ensuing header or headers (diamond 508) may then be modified for only the information that is different such as the IP identification field, TCP/UDP checksum and sequence number (block 510). Keeping the header in the header memory 116 rather than system memory saves overhead.

A large send is a flow that helps the system with building TCP/IP headers. The system sends the controller 52, through the driver, a large packet with a prototype header. The controller breaks this large packet into small MTU sized packets and updates the packet header based on the prototype header sent with the large packet (IP identification, sequence number, checksum calculation, flags and so on).

Figure 5B:
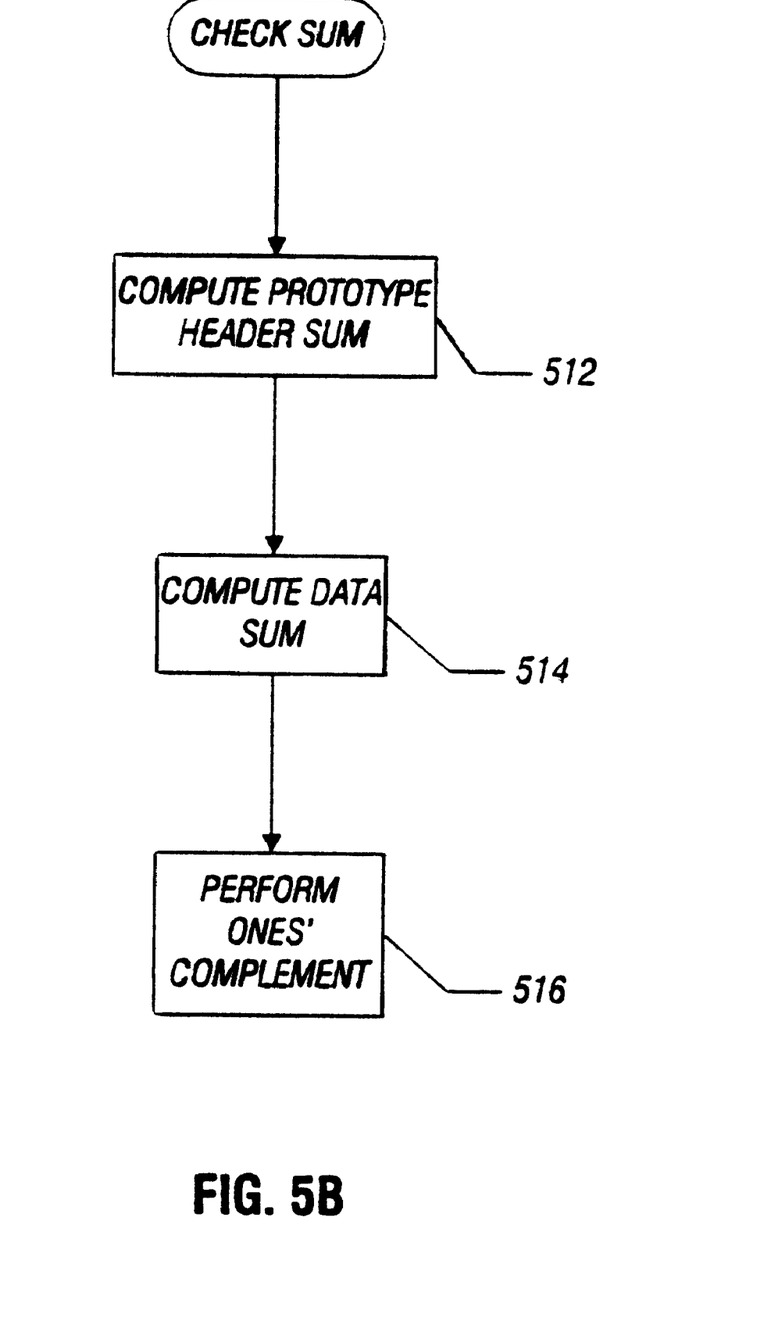
FIG. 5b shows a method of generating a partial checksum.

The controller 52 loads the prototype header into a header file in memory 116 while the parser 114 helps in parsing the header and informs the state machine 115 about offsets in the first header. The first header, i.e. the prototype header, for the first or prototype frame is different than the subsequent headers. A method of aggregating the initial header checksum with the data checksum to get an overall checksum which is not a full checksum, as illustrated in FIG. 5b, may save effort. The driver may compute the sixteen bit sum of the prototype header including all fixed fields and a pseudo-header (block 512).

The pseudoheader may include the IP addresses (source and destination) and the protocol fields of the IP frame, and the TCP total length of the header, options and the data length. The TCP total length may include the TCP trailer. In this way, the processing may be done in a layered fashion, using the pseudoheader, between the IP and TCP processing and allows information not available in the original package to be handled in software.

The hardware computes the checksum of the data and when all fields have been added (block 514), the hardware performs a one's complement (block 516). This method may save complexity from hardware while avoiding unnecessary hardware and software operations.

Again for the prototype frame, only the micro-machine (state machine) 115 asserts a busy status bit and sets the parser 114 in a parse only mode. In this mode the parser 114 analyzes the packet header and does not forward it to the FIFO memory 122. The micro-machine examines the parser results and fills in missing data (e.g. including SNAP length, IP total length, TCP sequence number, clear FIN and PSH flags, and/or UDP length and/or RTP fields) to command the checksum engine and authentication/encryption engine for later operations. It then places the parser in a normal mode and enables normal transmit operation of the transmit path 94. The parser loads data from FIFO 122 registers to the state machine to calculate and prepare the header file for the large send transmission. The FIFO registers that are loaded include IP offset in bytes, TCP offset in bytes, and TCP/UDP#.

Next, the MTU sized first packet is produced by the micro-machine commanding the DMA on the number of additional bytes to fetch from the bus 72. All subsequent frames of the large send block are treated differently. First, the prototype header is fetched from the header memory 116, then the micro-machine adjusts the content of all header fields subject to change (which may include the IP identification increment, and the TCP sequence number update).

The last frame is different. Its size may be smaller than MTU and some flags may carry different values. For this frame the micro-machine may update the SNAP length, IP total length, IP identification increment, TCP sequence number update fields, while FIN and PSH may be set in case the original prototype header had set them. The transmit path 94 operates in normal mode thereafter. All of the large send packet segments are treated as regular packets, subject to full or partial parsing.

Although normally a large send is not used when the flow includes security frames, a large send may be implemented even with Encapsulating Security Payload (ESP) datagrams. The ESP specification is set forth in "R. Atkinson, IP Encapsulating Security Payload (ESP). Request for comments (proposed standard) RFC 1827, Internet Engineering Task Force, August 1995." A special memory 550 may be provided for the trailer used with ESP datagrams. By storing the ESP trailer in the memory 550, the controller hardware can then deal with security frames in large sends as described previously.

In some embodiments, the receive parser 98 may include one or more state machines, counter(s) and timer(s), as examples, to perform the following functions. In particular, referring to FIG. 9, the receive parser 98 may continually check (block 200) for another unparsed incoming packet. When another packet is to be processed, the receive parser 98 may check the integrity of the packet, as indicated in block 201. For example, the receive parser 98 may determine if the incoming packet includes an IP header and determine if a checksum of the IP header matches a checksum that is indicated by the IP header.

Figure 9:
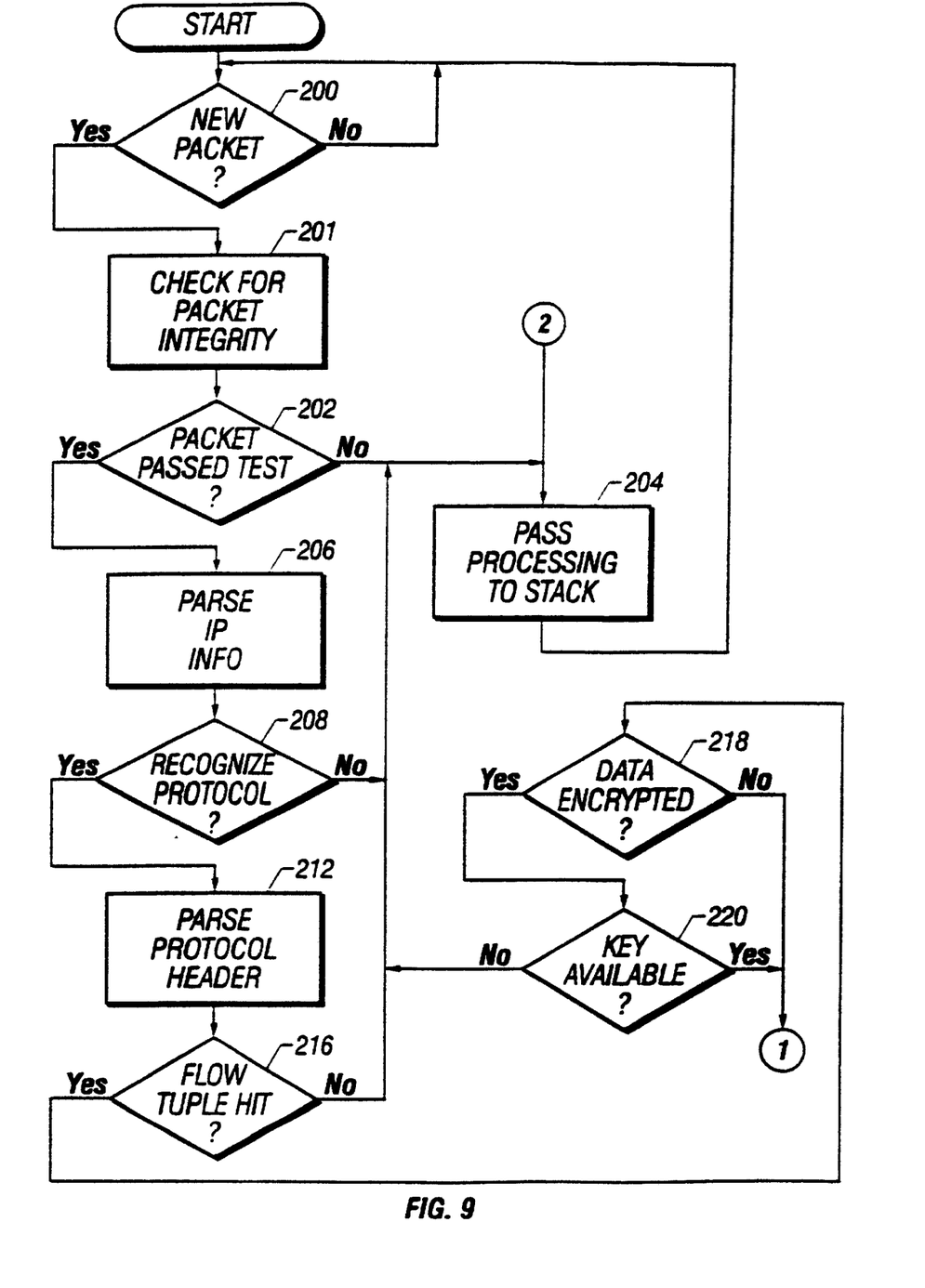
FIGS. 9 and 10 are flow diagrams illustrating parsing of packet data by a receive parser of the network controller of FIG. 5.

If the receive parser 98 determines (diamond 202) that the incoming packet passes this test, then the receive parser 98 may parse (block 206) the header to extract the IP components of a header of the packet to obtain the information needed to determine if a flow tuple hit occurs. For example, the receive parser 98 may extract the network protocol being used, IP destination and source addresses, and the port destination and source addresses. Next, the receive parser 98 may determine if the network protocol is recognized, as indicated in diamond 208. (In the case of an IPSec frame, the receive parser 98 may also check whether the frame uses the Authentication Header (AH) or ESP transform and compare it to the expected format stored in the tuple). If not, then the receive parser 98 may pass (block 204) further control of the processing to the network stack.

The receive parser 98 may subsequently parse (block 212) the protocol header. As an example, if the packet is associated with the TCP/IP protocol, then the receive parser 98 may parse the TCP header of the packet, an action that may include extracting the TCP ports and security attributes of the packet, as examples. The receive parser 98 uses the parsed information from the protocol header to determine (diamond 216) if a flow tuple hit has occurred. If not, the receiver parser 98 passes control of further processing of the packet to the stack, as depicted in block 204. Otherwise, the receive parser 98 determines (diamond 218) if the data portion of the packet needs to be decrypted. If so, the receive parser 98 determines if the associated key is available in the key memory 104, as depicted in diamond 220. If the key is not available, then the receive parser 98 may return to block 204 and thus, pass control of further processing of the packet to the stack.

Figure 10:
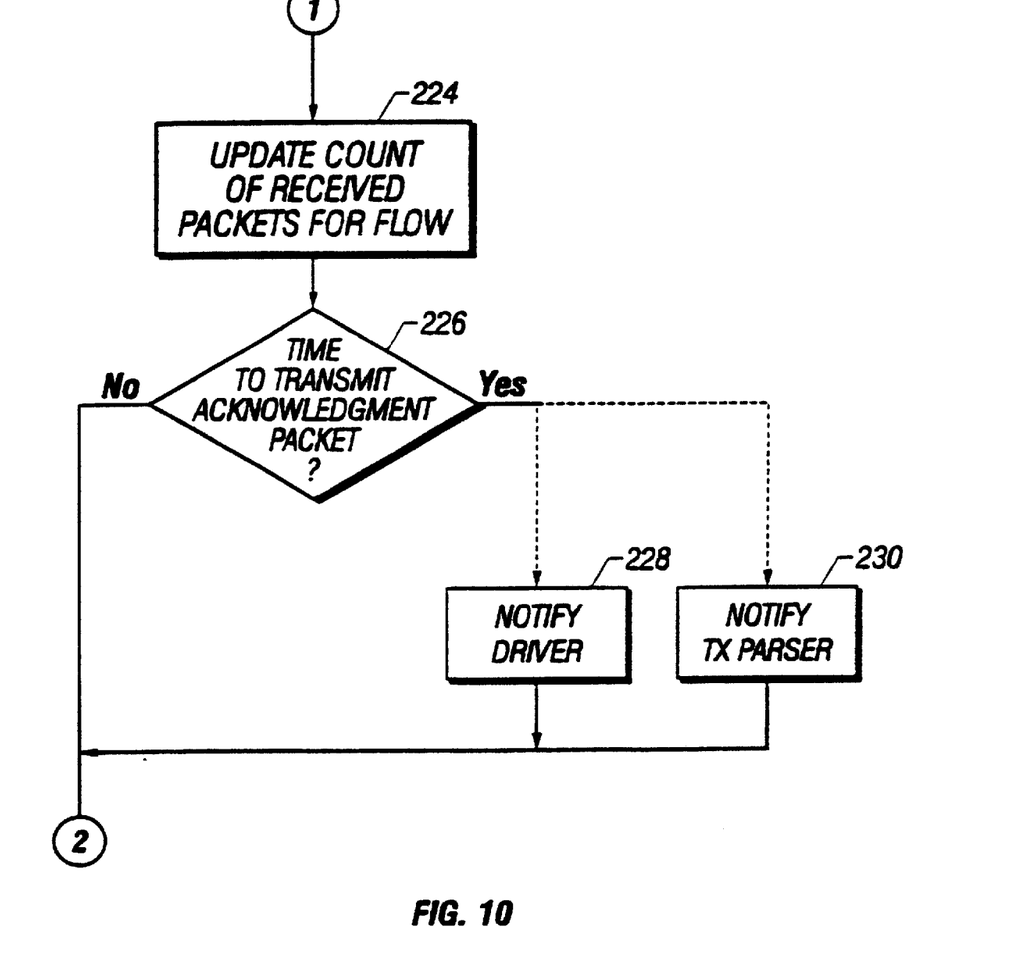

Referring to FIG. 10, if the key is available, the receive parser 98 may update a count of the number of received packets for the associated flow, as depicted in block 224. Next, the receive parser 98 may determine (diamond 226) whether it is time to transmit an acknowledgment packet back to the sender of the packet based on the number of received packets in the flow In this manner, if the count exceeds a predetermined number that exceeds the window (i.e., if the amount of unacknowledged transmitted data exceeds the window), then the receive parser 98 may either (depending on the particular embodiment) notify (block 228) the driver program 57 (see FIG. 4) or notify (block 230) the transmit parser 114 of the need to transmit an acknowledgment packet. Thus, in the latter case, the transmit parser 114 may be adapted to generate an acknowledgment packet, as no data for the data portion may be needed from the application layer. The receive parser 98 transitions from either block 228 or 230 to diamond 200 to check for another received packet. After an acknowledgment packet is transmitted, the receive parser 98 may clear the count of received packets for that particular flow.

Figure 11:
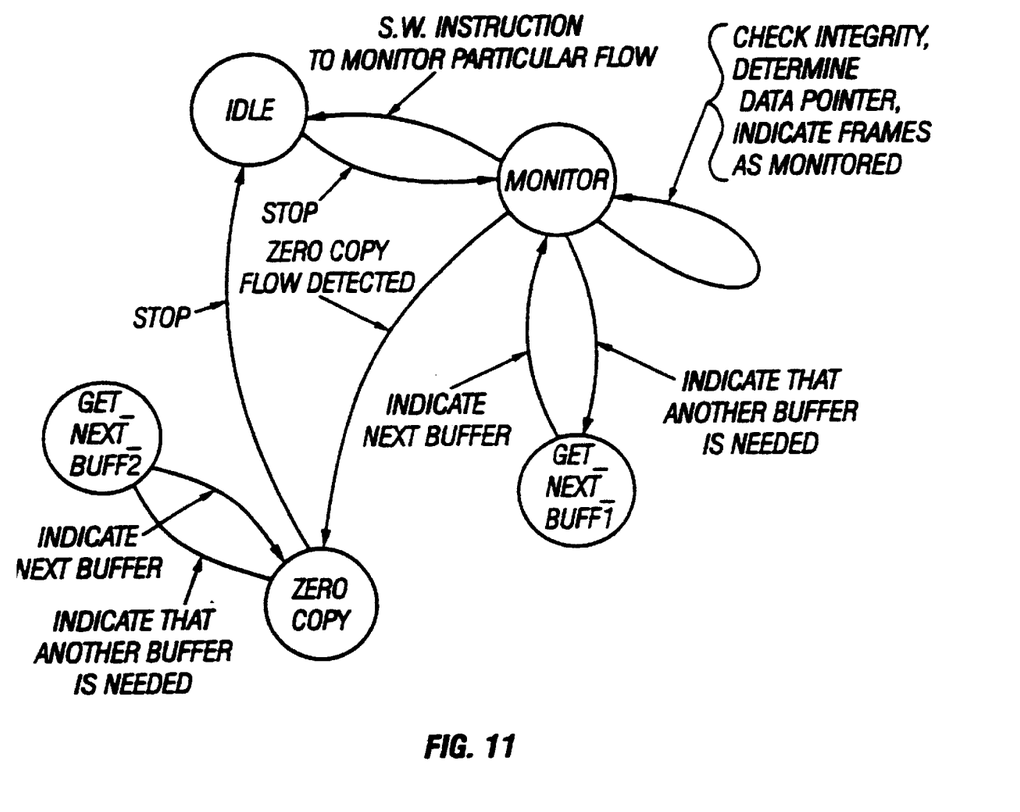
FIG. 11 is a flow diagram illustrating operation of a zero copy parser of the network controller of FIG. 5.

Referring to FIG. 11, in some embodiments, the zero copy parser 110 may include one or more state machines, timer(s) and counter(s) to perform the following functions to transfer the packet data directly to the buffers 304. First, the zero copy parser 110 may determine if control of the transfer needs to be synchronized between the zero copy parser 110 and the stack. In this context, the term "synchronization" generally refers to communication between the stack and the zero copy parser 110 for purposes of determining a transition point at which one of the entities (the stack or the zero copy parser 110) takes control from the other and begins transferring data into the buffers 304. Without synchronization, missing packets may not be detected. Therefore, when control passes from the stack to the parser 110 (and vice versa), synchronization may need to occur, as depicted in block 254.

Figure 12:
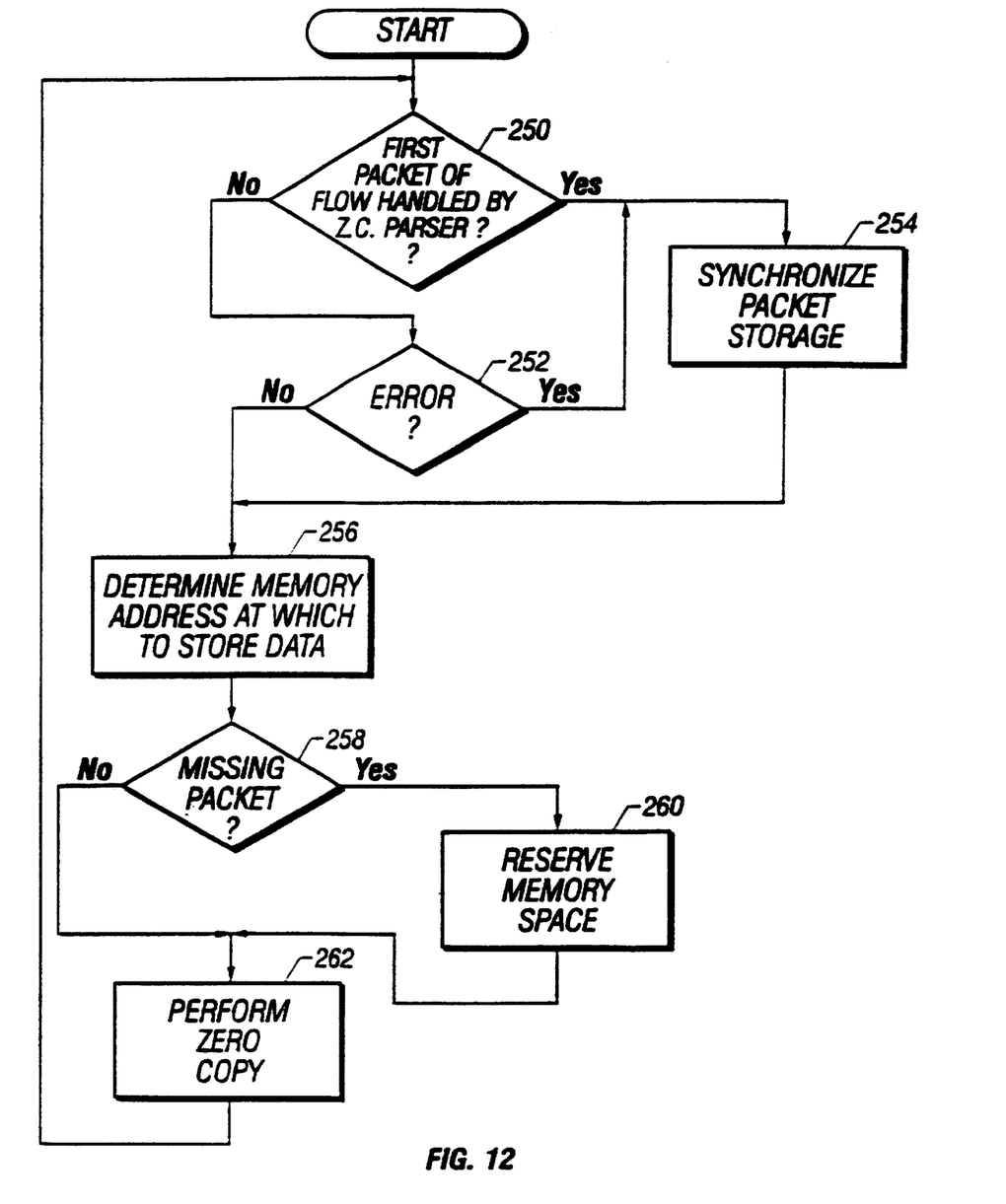
FIG. 12 is another flow diagram illustrating the operation of a zero copy parser.

Thus, one scenario where synchronization may be needed is when the zero copy parser 110 initially takes over the function of directly transferring the data portions into the buffers 304. As shown in FIG. 12, in this manner, if the zero copy parser 110 determines (diamond 250) that the current packet is the first packet being handled by the zero copy parser 110, then the parser 110 synchronizes the packet storage, as depicted by block 254. For purposes of determining when the transition occurs, the zero copy parser 110 may continually monitor the status of a bit that may be selectively set by the driver program 57, for example. Another scenario where synchronization is needed is when an error occurs when the zero copy parser 110 is copying the packet data into the buffers 304. For example, as a result of the error, the stack may temporarily resume control of the transfer before the zero copy parser 110 regains control. Thus, if the zero copy parser 110 determines (diamond 252) that an error has occurred, the zero copy parser 110 may transition to the block 254.

Synchronization may occur in numerous ways. For example, the zero copy parser 110 may embed a predetermined code into a particular packet to indicate to the stack that the zero copy parser 110 handles the transfer of subsequent packets. The stack may do the same.

Occasionally, the incoming packets of a particular flow may be received out of sequence. This may create a problem because the zero copy parser 110 may store the data from sequential packets one after the other in a particular buffer 304. For example, packet number "267" may be received before packet number "266," an event that may cause problems if the data for packet number "267" is stored immediately after the data for packet number "265." To prevent this scenario from occurring, in some embodiments, the zero copy parser 110 may reserve a region 308 (see FIG. 7) in the particular buffer 304 for the missing packet data, as indicated in block 260 (FIG. 11). For purposes of determining the size of the missing packet (and thus, the amount of memory space to reserve), the zero copy parser 110 may use the sequence numbers that are indicated by the adjacent packets in the sequence. In this manner, the sequence number indicates the byte number of the next successive packet. Thus, for the example described above, the acknowledgment numbers indicated by the packet numbers "265" and "267" may be used to determine the boundaries of the region 308.

The zero copy parser 110 subsequently interacts with the PCI interface 130 to set up the appropriate DMA channel to perform a zero copy (step 262) of the packet data into the appropriate buffer 304. The zero copy parser 110 determines the appropriate buffer 304 via the destination port that is provided by the receive parser 98.

Referring back to FIG. 4, besides the network controller 52, the computer system 50 may include a processor 54 that is coupled to a host bus 58. In this context, the term "processor" may generally refer to one or more central processing units (CPUs), microcontrollers or microprocessors (an X86 microprocessor, a Pentium microprocessor or an Advanced RISC Controller (ARM), as examples), as just a few examples. Furthermore, the phase "computer system" may refer to any type of processor-based system that may include a desktop computer, a laptop computer, an appliance or a set-top box, as just a few examples. Thus, the invention is not intended to be limited to the illustrated computer system 50 but rather, the computer system 50 is an example of one of many embodiments of the invention.

The host bus 58 may be coupled by a bridge, or memory hub 60, to an Advanced Graphics Port (AGP) bus 62. The AGP is described in detail in the Accelerated Graphics Port Interface Specification, Revision 1.0, published in Jul. 31, 1996, by Intel Corporation of Santa Clara, Calif. The AGP bus 62 may be coupled to, for example, a video controller 64 that controls a display 65. The memory hub 60 may also couple the AGP bus 62 and the host bus 58 to a memory bus 61. The memory bus 61, in turn, may be coupled to a system memory 56 that may, as examples, store the buffers 304 and a copy of the driver program 57.

The memory hub 60 may also be coupled (via a hub link 66) to another bridge, or input/output (I/O) hub 68, that is coupled to an I/O expansion bus 70 and the PCI bus 72. The I/O hub 68 may also be coupled to, as examples, a CD-ROM drive 82 and a hard disk drive 84. The I/O expansion bus 70 may be coupled to an I/O controller 74 that controls operation of a floppy disk drive 76 and receives input data from a keyboard 78 and a mouse 80, as examples.

Other embodiments are within the scope of the following claims. For example, a peripheral device other than a network controller may implement the above-described techniques. Other network protocols and other protocol stacks may be used.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method of developing a checksum comprising:
    aggregating an initial header checksum with a data checksum to develop an overall checksum;
    computing a sum of the initial header including a plurality of fields and a pseudoheader; and
    performing a one's complement.

2. The method of claim 1 further including using a driver to compute the sum of the initial header and a pseudoheader.

3. The method of claim 2 further including using hardware to compute the data checksum and to perform the one's complement.

4. The method of claim 3 including performing the one's complement after the sum of the initial header including a plurality of fields in a pseudoheader have been added.

* * * * *